United States Patent [19]

Landsinger et al.

[11] 4,075,771
[45] Feb. 28, 1978

[54] TOY SIMULATING A CALCULATOR

[75] Inventors: Edmund Emil Landsinger, Torrance; Richard Shih-Teng Chang, Rolling Hills Estates; William Joseph Gross, Rancho Palos Verdes, all of Calif.

[73] Assignee: Mattel, Inc., Hawthorne, Calif.

[21] Appl. No.: 758,597

[22] Filed: Jan. 12, 1977

[51] Int. Cl.² .................... G09B 19/02; A63H 33/30
[52] U.S. Cl. ......................................... 35/31 R; 46/39
[58] Field of Search .................... 35/5, 6, 31 R, 31 A, 35/31 C, 35 G, 76; 46/2, 4, 5, 39

[56] References Cited

U.S. PATENT DOCUMENTS

| | | | |
|---|---|---|---|
| 2,317,107 | 4/1943 | Oesch | 35/31 C X |
| 2,687,581 | 8/1954 | Williams | 35/31 R |
| 2,795,862 | 6/1957 | Poole | 35/31 R |
| 2,842,871 | 7/1958 | Laird | 35/31 R |
| 3,538,621 | 11/1970 | Mayeda | 35/6 X |
| 3,624,687 | 11/1971 | Cagnolatti | 35/31 C |
| 3,667,136 | 6/1972 | Goodkind et al. | 46/4 X |
| 3,678,614 | 7/1972 | Nagel | 46/39 |

*Primary Examiner*—William H. Grieb
*Attorney, Agent, or Firm*—John G. Mesaros; Stephen L. King; Max E. Shirk

[57] ABSTRACT

A toy simulating a calculator having a visual display read-out by providing a housing having a display window with a continuous loop of strip material viewable therein, the strip having a plurality of stations with indicia thereon, the stations being preselectable by a child using the toy. A keyboard is provided, the keyboard having an actuating key and a plurality of indicating keys, each of the indicating keys having indicia thereon corresponding to a predetermined one of the stations. The mechanism includes a spring-biased disc having a plurality of projections thereon for coacting with a depressed indicating key, the mechanism being operated by a pull string which removes the stations from view, the strip then being moved under force of the spring upon sequential activation of an indicating key and the actuating key to permit the preselected one of the stations to appear at a predetermined location in a display window.

20 Claims, 7 Drawing Figures

TOY SIMULATING A CALCULATOR

BACKGROUND OF THE INVENTION

The background of the invention will be discussed in two parts:

Field of the Invention

This invention pertains to the field of toys and more particularly to a toy having a display window and a keyboard for simulating a calculator.

Description of the Prior Art

For children of tender years such as pre-school children, toys having educational value are quite popular. Such toys include, for example, toys that teach a child to identify numerals or the alphabet; toys that teach a child to identify pictures indicative of common objects such as cars, animals or the like; or sound-reproducing toys having a prerecorded sound emitted in response to a users selection of a predetermined picture, for example.

Prior art known to the applicant is listed by way of illustration, and not of limitation, in a separate communication to the Patent Office.

SUMMARY OF THE INVENTION

It is an object of this invention to provide a new and improved toy simulating a calculator.

It is another object of this invention to provide a new and improved toy calculator which has educational value.

The foregoing and other objects of the invention are accomplished by providing a toy having a housing with a display window therein with a strip mounted within the housing, the strip having a plurality of stations with each of the stations having indicia viewable through the display window. A keyboard is provided with an actuating key and a plurality of indicating keys with each of the indicating keys having indicia thereon corresponding to a selected one of the stations. A spring-biased disc is rotatably mounted within the housing for rotation in a plane parallel to the plane of the keyboard, the disc being provided with a plurality of encoding projections, each of the projections being adapted to coact with a given key upon depression thereof for limiting movement of the strip upon actuation. The disc is rotated by means of a pull string to remove all stations from view. Upon successive actuation of an indicating key and the actuating key, the disc is rotated in the opposite direction under force of the spring until a given projection abuts against a portion of the depressed indicating key thereby displaying the selected station at a predetermined location in the display window.

Other objects, features and advantages of the invention will become apparent upon a reading of the specification when taken in conjunction with the drawings in which like-reference characters refer to like elements in several views.

DESCRIPTION OF THE PREFERRED EMBODIMENT

Figure 1:
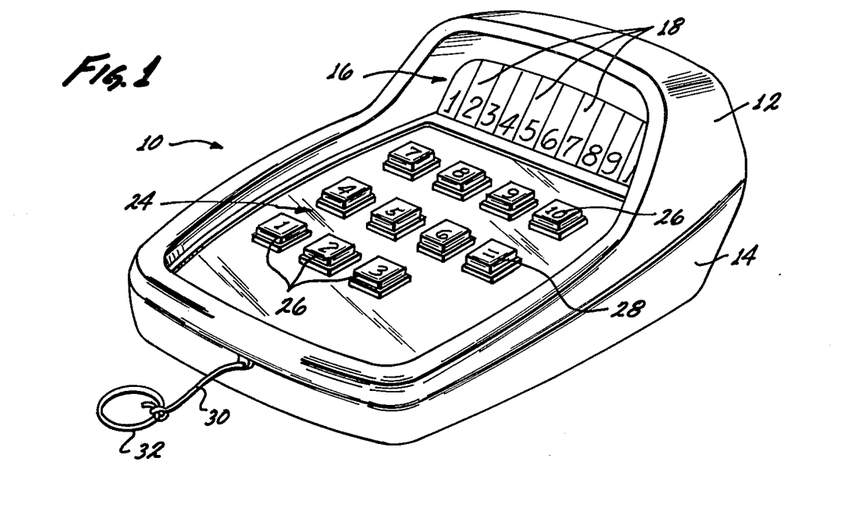
FIG. 1 is a perspective view of the simulated toy calculator according to the invention.

Referring now to the drawings and particularly to FIG. 1 there is shown a toy simulating a calculator having a housing, generally designated 10, formed from a top cover 12 and a bottom cover 14. The top cover 12 is provided at one end with an upwardly extending portion having a display window 16 for displaying therein a plurality of stations 18, these stations having imprinted thereon indicia such as numerals or the like. In the present embodiment, the stations 18 have the numerals "1" through "10" imprinted thereon, reading from left to right. To correlate with the stations 18 within the display window 16, a keyboard generally designated 24 is provided, the keyboard 24 being provided with a plurality of indicating keys 26 which have indicia thereon corresponding to the indicia imprinted on the stations 18 with each indicating key 26 corresponding to a predetermined station 18. In addition, the keyboard 24 is provided with an actuating key 28 having imprinted thereon an "equal" sign. The keyboard 24 is configured, in the present embodiment, to simulate the keyboard of a calculator with the indicating keys 26 containing the numerals "1" through "10". Actuation of the device is accomplished by means of a pull string 30 having a ring 32 at the free end thereof for grasping by a child.

Figure 2:
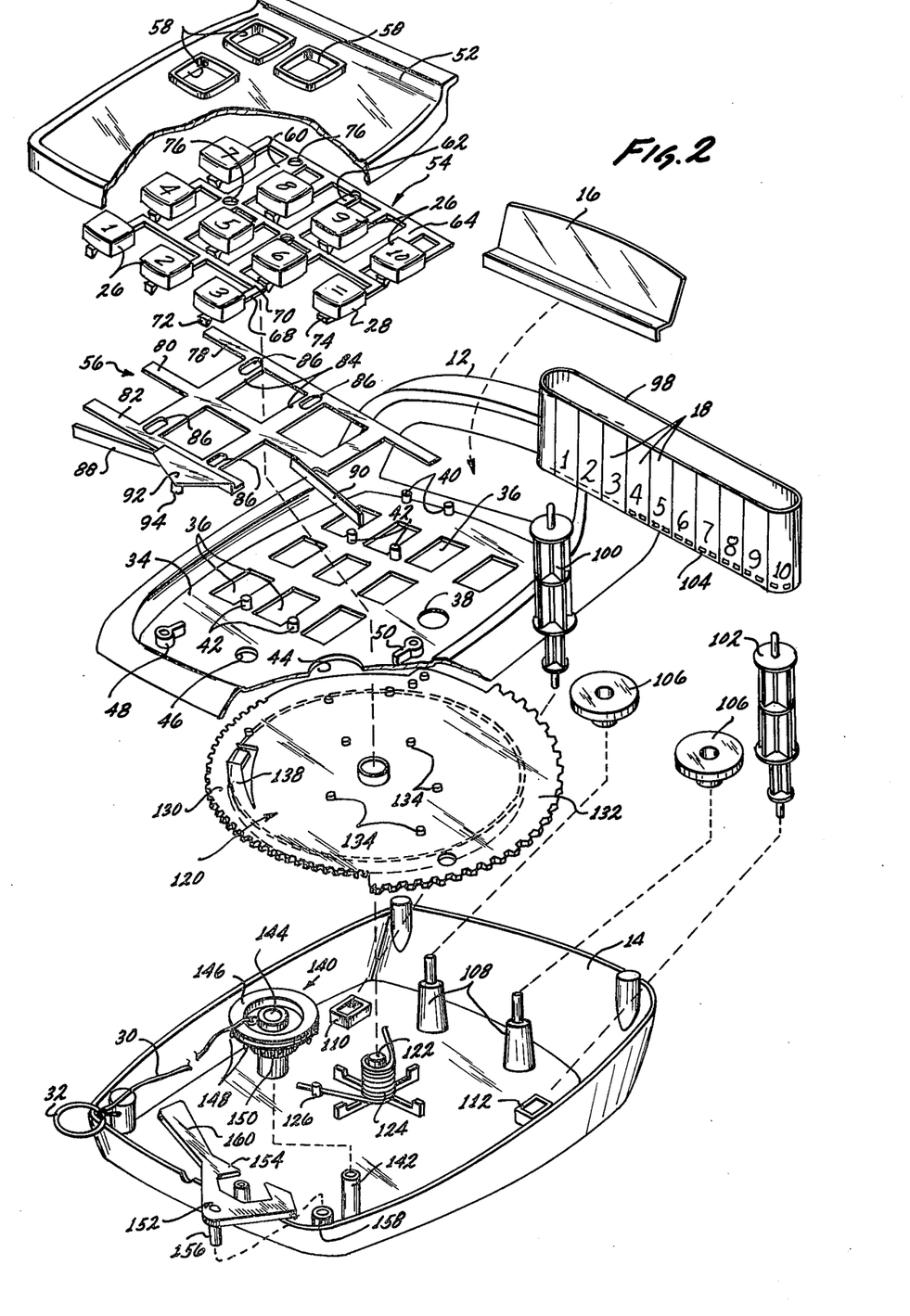
FIG. 2 is an exploded perspective view (partially broken away) of the toy of FIG. 1.

Referring now to FIG. 2, the elements comprising the toy are shown in an exploded perspective view with portions broken away. The top cover 12 has a keyboard retaining surface 34 formed integral therewith, the surface 34 being generally planar and having a plurality of generally rectangular apertures 36 formed therein for passage therethrough of portions of the indicating keys 26. A generally circular aperture 38 is formed in the surface 34 to permit passage therethrough of a portion of the actuating key 28. Also formed integrally with the surface 34 is a first pair of locator pins 40 and two pair of retainer pins 42 positioned intermediate the first two columns of apertures 36.

The surface 34 is also provided at the foot thereof with an enlarged aperture 44 adjacent the lower right-hand corner, a smaller aperture 46 centrally disposed, a first boss 48 adjacent the lower left-hand corner and a second boss 50 adjacent the right-hand edge near aperture 38.

The keyboard sub-assembly includes a keyboard cover plate 52, a keyboard tree 54 and a locking bar member 56 which are adapted to be mounted on the surface 34. The keyboard cover plate 52 is provided with a plurality of apertures 58 (only three of which are shown), the number of apertures 58 corresponding to the number of indicating keys 26 plus the actuating key 28 totaling eleven apertures 58. The keyboard tree 54 is a single piece of plastic having each of the indicating keys 26 and actuating key 28 molded integrally therewith, the tree 54 having three main trunk portions 60, 62 and 64 which are generally parallel bar portions having branches extending therefrom in a transverse direction. Extending from the branches are the individual keys. By way of example, indicating key 26 bearing the indicia "3" is provided at one end with a supporting arm 68 which is integral with transversely extending branch 70. In alignment with supporting arm 68 at the other end of indicating key 26 is a locking tab 72 which extends outwardly from the bottom edge of indicating key 26 and has a downwardly extending wedge-shaped cross section. All the other indicating keys 26 are similarly configured. Actuating key 28 is similarly supported by a branch of the keyboard tree 54, but instead of a locking tab 72, a stop tab 74 is provided at the free end of actuating key 28. The stop tab 74 is simply an outwardly extending projection adjacent the bottom edge of actuating key 28 and as will be hereinafter described, the actuating key 28 is not intended to be locked in position but is simply a one time depression to actuate the mechanism. As can be seen, each of the indicating keys 26 and the actuating key 28 is suspended at one end by a support arm 68 so that the keys may be depressed.

For assembly purposes, the keyboard tree 54 has four apertures 76 extending through the trunks 60 and 62 thereof, the apertures 76 being adapted to coact with the locator pins 40 and one pair of retainer pins 42. Positioned intermediate the keyboard tree 54 and the surface 34 of the cover 12 is the locking bar member 56, which is a generally open framework construction with three parallel lock bars 78, 80 and 82 being configured to releasably engage the locking tabs 72 of the indicating keys. Extending transversely of the lock bars 78, 80 and 82 are interconnecting bars 84, each of the bars 84 having a pair of elongate apertures 86 extending therethrough, the apertures 86 having a width equal to that of the retaining pins 42 in the surface 34 of top cover 12 for engagement therewith in sliding relationship. Formed integrally with the locking bar member 56 is a first leaf spring 88 diverging outwardly from the lock bar 82 and a second leaf spring 90 diverging outwardly from lock bar 80. The locking bar member 56 is provided with an integral tongue 92 which is generally planar in form and slightly offset from the plane of the main framework, the tongue 92 having a downwardly depending pull pin 94 formed in the under surface thereof. When the locking bar member 56 is assembled to the surface 34, the retainer pins 42 engage the elongate apertures 86 in sliding relation with the pull pin 94 fitting within aperture 46 of the surface 34. The locking bar member 56 is biased in a direction towards the display window 16 by means of the leaf springs 88 and 90 engaging the bosses 48 and 50 respectively (see also FIG. 4). The keyboard tree 54 is then fitted to the cover 12 by means of the aperture 76 being inserted over the locator pins 40 and the upper pair of retainer pins 42. The keyboard cover plate 52 is then positioned over the keyboard tree 54 and suitably secured to the top cover 12.

The display sub-assembly includes a continuous loop of strip material 98 which has imprinted thereon a plurality of stations 18, the stations 18 having indicia such as numerals imprinted thereon for display through the display window 16. The display window 16 and the strip 98 are configured so that approximately one-half of the length of strip 98 is viewable through the display window 16, this half of the strip containing all the stations 18. The strip 98 is supported in taut relationship by means of rollers 100 and 102 being inserted therethrough and rotatably supported between the top cover 12 and the bottom cover 14 of the housing. The lower edge of the strip 98 is provided with a row of perforations 104, the row 104 being approximately one-half the length of the strip. Supporting the outer surface of the strip 98 is a pair of idler wheels 106 which are rotatably secured to axle projections 108 formed within the bottom cover 14.

Figures 5, 6, 7:
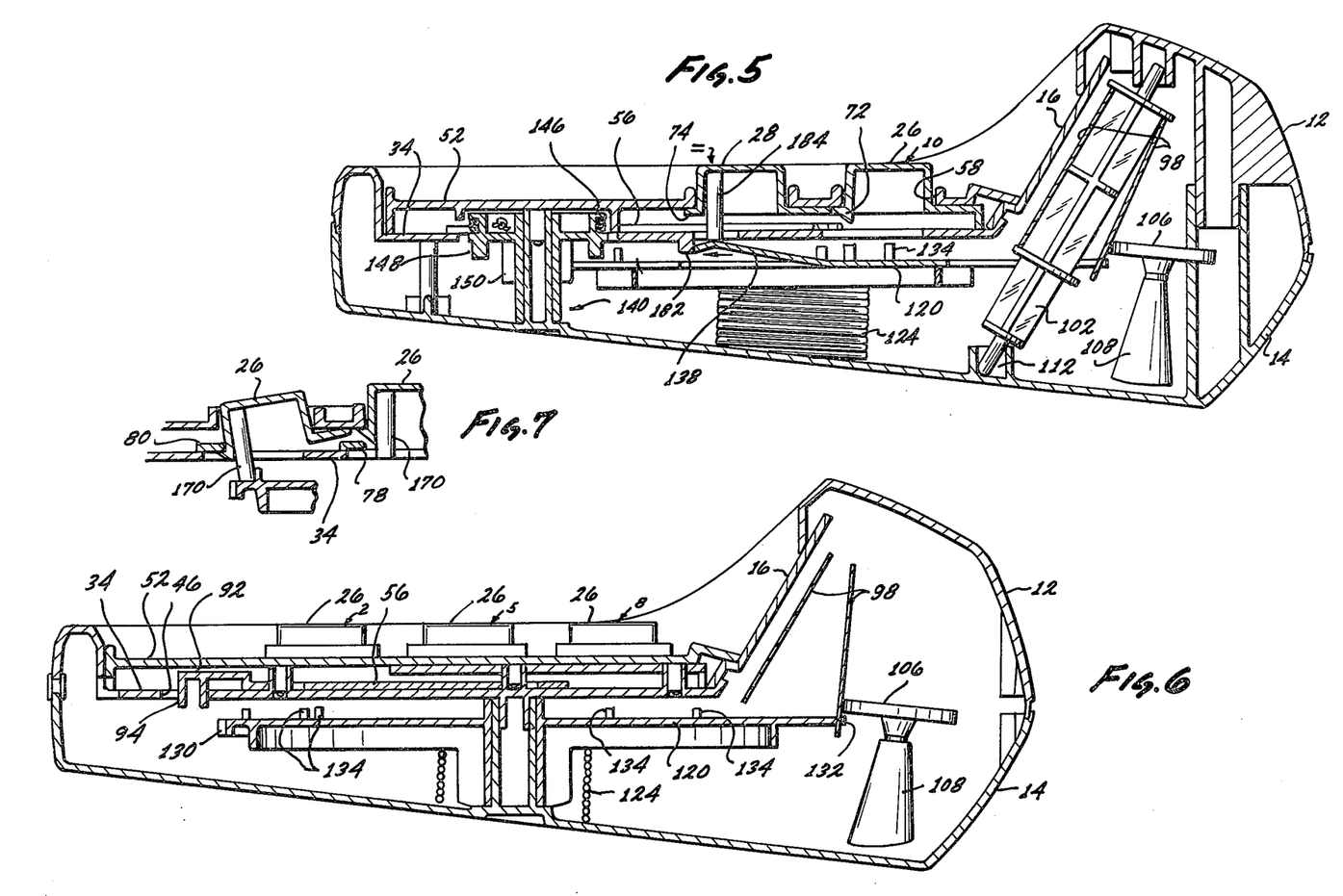
FIG. 5 is a cross-sectional view of the toy of FIG. 1 with the cover in place viewed generally along line 5—5 of FIG. 3.
FIG. 6 is a cross-sectional view of the toy of FIG. 1 with the cover in place viewed generally along line 6—6 of FIG. 3.
FIG. 7 is a partial cross-sectional view showing an indicating key in its activated condition.

In its assembled condition, the rollers 100 and 102 are supported at an angle in elongate openings formed in the axle bosses 110 and 112 formed in the bottom of cover 14 and mate with similar bosses at the upper ends thereof formed on the inner surface of top cover 12 (see also FIG. 5). The strip material 98 is positioned in generally taut relation over the rollers 100 and 102 with the plane of the strip being generally parellel to the plane of the display window 16 in close spaced relationship. The idler wheels 106 (see also FIG. 3) abut against the lower edge of the reverse side of the strip 98 to maintain the perforations 104 in engagement with the teeth of the disc 120 in the drive mechanism as will hereinafter be discussed.

Still referring to FIG. 2, the drive and logic mechanism sub-assembly includes a main disc 120 rotatably secured to an axle 122 formed on the interior surface of the bottom cover 14 at approximately its geometric center. Encircling the axle 122 is a coil spring 124 having one end thereof secured against rotation by a projection 126. The other end of coil spring 124 abuts against a downwardly depending projection on the undersurface of disc 120, the configuration of coil spring 124 along with the coacting projections at the free ends thereof being adapted to bias the disc 120 in a clockwise direction as viewed in FIG. 2.

The disc 120 is generally circular in form and is provided about the periphery thereof with a first drive gear sector 130 and a second strip advance gear sector 132, the sector 132 having a radius slightly larger than the radius of the first sector. The strip advance sector 132 is provided with teeth which matingly engage the row of perforations 104 along the bottom edge of strip 98 to provide linear movement of the strip 98 in response to rotational movement of the disc 120.

Extending upwardly from the surface of disc 120 is a plurality of encoding pins 134, the number and locations of pins 134 being preselected to provide a plurality of angular positions wherein the disc 120 can be stopped in response to a preselected one of the indicating keys 26 to thereby display only those stations 18 in the display window 16 bearing the indicia up to the selected station which is then displayed at a predetermined location on the right-hand side of the display window 16. Formed integrally with the surface of the disc 120 is an upwardly extending resilient actuating arm 138 extending in a circumferential direction and positioned to coact with the actuating key as will hereinafter be discussed.

The member coacting with the drive sector 130 of disc 120 is the drive wheel, generally designated 140, which is rotatably secured within the bottom cover 14 by means of an axle projection 142 extending through an aperture 144 formed in drive wheel 140. The drive wheel 140 is provided with an enlarged cylindrical spool 146 adjacent the upper edge thereof about which is received the string 30. Formed on the undersurface of spool 146 are downwardly depending teeth 148, the teeth 148 being equi-angularly disposed about the periphery to form an escapement wheel. The drive wheel 140 is provided, intermediate the opposite ends thereof, with a reduced diameter gear 150 which meshes with the teeth of drive sector 130 of disc 120. Coacting with the escapement wheel formed by the teeth 148 is an escapement arm 152 having an anchor portion 154 adapted for movement about the shaft 156 which is pivotally secured to a boss 158 within the bottom cover 14. Extending outwardly and integral with one end of anchor 154 is a clapper 160 which is adapted and configured to beat against the inner surface of bottom cover 14 during movement of the escapement arm 152.

During assembly of the drive mechanism the disc 120 is positioned against the force of the bias provided by coil spring 124 with the strip 98 coacting with disc 120 so that all ten stations 18 are viewable in window 16. The drive wheel 140, with the coil 30 wound therearound is inserted with gear 150 engaging the drive sector 130 and the escapement wheel teeth 148 fitting between anchor 154 of escapement arm 152. With the balance of the display sub-assembly and keyboard sub-assembly suitably secured to the unit, as hereinabove described, the toy is then ready for operation. In its assembled condition, with the pull string 30 fully within the unit and no indicating keys 26 depressed, all 10 stations will be viewable through the display window 16.

Figure 3:
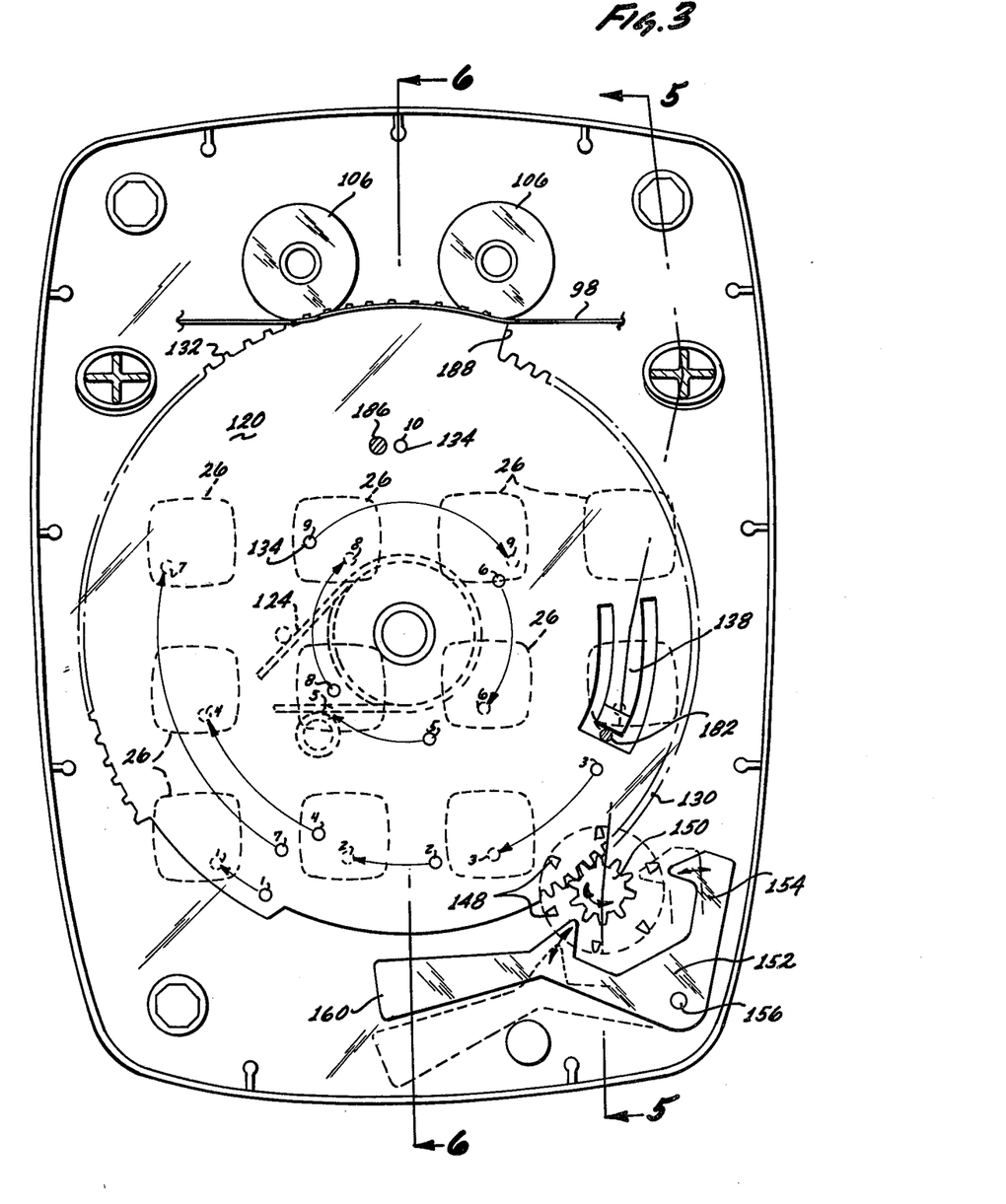
FIG. 3 is a plan view of the toy of FIG. 1 with the cover removed and with the dotted lines depicting the position of the keys.
Figure 4:
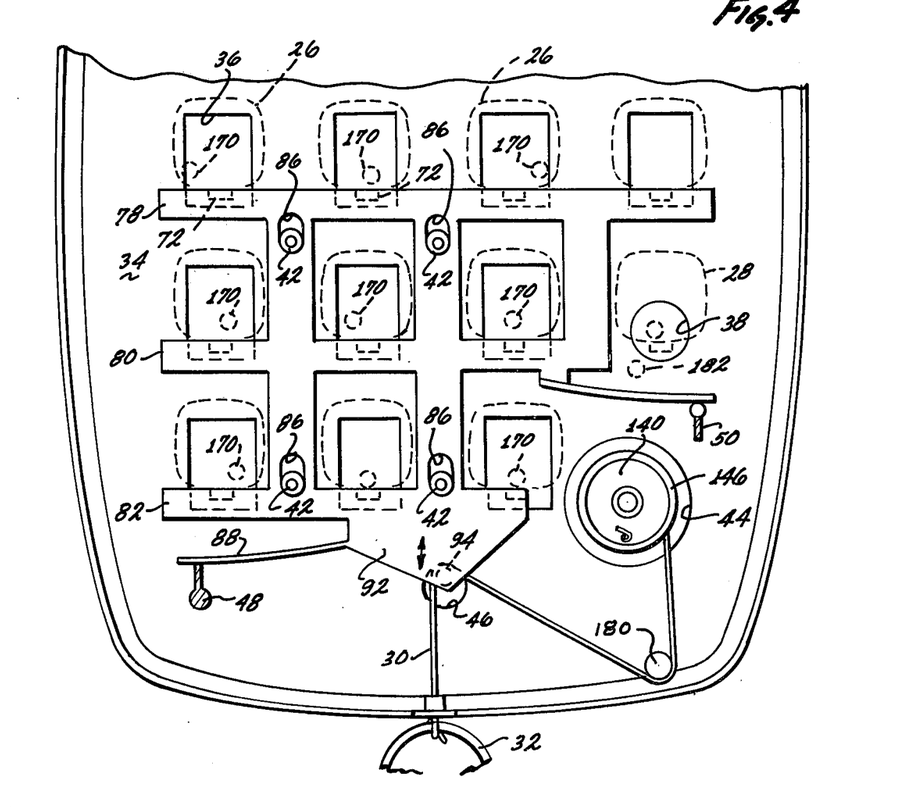
FIG. 4 is a partial plan view showing the locking plate for the keyboard mechanism.

Referring now to FIG. 4, the relative position of the locking bar member 56 with respect to the indicating keys 26 (shown in dotted lines) and the aligned apertures 36 formed in the surface 34 of top cover 12 will be discussed. For ease of discussion, the top four indicating keys 26 extending from left to right constitute a first row of indicating keys with corresponding second and third rows from top to bottom. The first row of indicating keys 26 coacts with lock bar 78; the second row of indicating keys 26 coact with lock bar 80; and the third row coacts with lock bar 82. Downwardly depending from the undersurface of nine of the indicating keys 26 is a locating or decoding pin 170 which extends down through its respective aperture 36, the various decoding pins 170 being positioned adjacent the lower edge of the respective indicating key 26 with the pins 170 being laterally displaced along the lower edge. Referring also to FIG. 3, the placement of the decoding pins 170 is such as to permit engagement with a corresponding encoding pin 134 upwardly extending from the disc 120. As can be seen in FIG. 3, the location of a given encoding pin 134 corresponding to a given angular position of disc 120 for a preselected one of the indicating keys 26 is such as to prevent interference with all other pins but the decoding pin selected by depression of a suitable indicating key 26.

Referring now to FIG. 4, the keyboard locking mechanism will be discussed. The pull string 30 is within the toy prior to actuation, the pull string 30 being wound about the spool 146 of drive wheel 140. The indicating keys 26 and actuating key 28 are illustrated in dotted lines to show the positions thereof with respect to their coacting apertures 36 and 38 respectively formed within the surface 34 of top cover 12. The location of each decoding pin 170 with respect to its indicating key 26 is likewise illustrated in dotted lines as well as, of course, the integral locking tabs 72 of each of the indicating keys 26. Referring briefly to FIG. 7, a cross sectional view of an indicating key 26 is illustrated, the indicating key 26 on the right in FIG. 7 showing the decoding pin 170 downwardly depending from the undersurface of the indicating key 26 in a direction generally perpendicular to the plane of the surface 34, the decoding pin 170 terminating generally flush with the bottom surface of surface 34. The indicating key 26 on the left in FIG. 7 is shown in its depressed and locked condition against lock bar 80. Referring again to FIG. 4 the locking bar member 56 is biased upwardly against the force of leaf springs 88 and 90, respectively, abutting against bosses 48 and 50 formed within the surface 34, locking bar member 56 being slidably mounted with respect to the surface 34 with the elongated apertures 86 being engaged by retainer pins 42. At this point, if any of the indicating keys 26 have been depressed, they would be locked in position (as shown in FIG. 7) with the upper edge of locking tab 72 being depressed below the adjacent surface of one of the lock bars of the locking bar member 56. However, when pull string 30 is pulled to rotate the spool 146 of drive wheel 140 in a clockwise direction as viewed in FIG. 4, as can be seen, the string passes over a boss 180 and thence over pull pin 94 of tongue 92 of locking bar member 56 outwardly through an aperture within bottom cover 14. Consequently, when the string 30 is pulled in a downward direction the locking bar member 56 travels downwardly a distance determined by the length of apertures 86, the distance being such to permit the upper edges of lock bars 78, 80 and 82 to clear the locking tab 72 of the indicating keys 26 thereby permitting any depressed indicating key 26 to return to its original or non-depressed condition. This results in a "clearing" of the keyboard upon actuation of the pull string 30 to "set" the calculator.

Referring now to FIG. 3 the working parts of the drive and logic mechanism will be discussed, the position of disc 120 in this illustration being the fully actuated position, that is, with the pull string 30 fully withdrawn from the calculator. As the drive wheel 140 is rotated in a clockwise direction to energize the unit the lower gear 150 which is coaxial therewith engages the drive gear sector 130 of disc 120 to thereby rotate disc 120 in a counterclockwise direction as viewed in FIG. 3 against the force of its coil spring 124 which is urging the disc 120 in a clockwise direction. The strip advance sector 132 of disc 120 engages the row of perforations 104 in strip 98 which is maintained in contact with the strip advance sector 132 by means of the idler rollers 106 abutting against strip 98 on either side of a longitudinal center line defining a narrow arc for maintaining contact. The strip 98, during energization is advanced to the right since the row of perforations 104 of strip 98 being engaged is on the nonviewable half of the strip 98 (see FIG. 6). With the disc 120 fully rotated to the position indicated in FIG. 3 all stations 18 of strip 98 have been removed from view through the display window 16. At this point, the resilient actuating arm 138 formed within disc 120 has the edge thereof abutting against a stop pin 182 which is a downwardly depending projection from the underside of surface 34, the position thereof being shown in FIG. 4 in dotted lines adjacent aperture 38 in surface 34. This engaged position of actuating arm 138 with stop pin 182 is illustrated in FIG. 5 which also illustrates the position of actuating pin 184 formed in the undersurface of actuating key 28. At this point, the calculator is ready for operation with the disc 120 being retained against rotation in the clockwise direction by means of the stop pin 182 engaging the stop arm 138.

As shown in FIG. 3, each of the encoding pins 134 extending upwardly from disc 120 is shown in solid lines with a number adjacent thereto, this number being indicative of the respective numeral with which the encoding pin 134 is correlated. The path of the respective encoding pin 134 is defined by an arrow to the respective decoding pin 170 with which it is associated, such decoding pins 170 being shown in dotted lines within its respective indicating key which is likewise shown in dotted lines. Thus, there is provided a mechanical logic unit wherein the encoding pins 134 are logically positioned about the surface of disc 120, the positions of pins 134 being predetermined so that a given pin 134 has a radial displacement and an angular position on the surface of the disc 120 to coact with only one decoding pin 170. This effects a linear positioning of the strip 98 within the display window 16 so that a given station 18, corresponding to the selected indicating key 26 stops at a predetermined location at the right-hand side within the display window 16 upon clockwise rotation of the disc 120. The selected or stopped position of the disc 120 is effected by the encoding pin 134 abutting against a decoding pin 170 caused by the selected or depressed indicating key 26.

The placement of pins 134 on disc 120 is further such as to define a path length as indicated by the relative length of the arrows between the stop pins 134 and the coacting decoding pin 170 associated therewith, it being noted that the path length between the encoding pin 134 for the numeral "1" to its coacting decoding pin 170 being the smallest path length to be traveled. Correspondingly the path length for the numeral "2" will be twice as large; for the numeral "3" will be three times as large and so forth. Thus it can be seen that the placement of the pins fix the path length which increases in multiples of the "unit path length," that being the path length for the numeral "1". This path length movement can alternatively be equated to the angular rotation of the disc 120, the angular rotation being a minimum for the numeral "1" and being 10 times that angle for the numeral "10". Although the drawing of FIG. 3 depicts an encoding pin 134 for the numeral "10", it is to be emphasized that the indicating key 26 for the numeral "10" does not contain a decoding pin 170, the angle of rotation for the numeral "10" being determined by the maximum length of the drive gear sector 130 of the disc 120. The stop pin 134 for numeral "10" coacts with a downwardly depending projection 186 on the underside of surface 134 to limit the counterclockwise rotation of disc 120 during initial energization of the calculator, the spacing between projection 186 and the coacting stop pin 134 permitting a slight amount of tolerance in the counterclockwise rotation of disc 120 which enables actuating arm 138 to override its stop projection 182 slightly, prior to being set in the position shown in FIG. 3 when the bias spring 124 urges the disc 120 in a clockwise direction.

Continuing the operation of the calculator, with the pull cord 30 all the way out of the calculator, the disc 120 is in the position indicated in FIG. 3 with the coil spring 124 urging the disc 120 in a clockwise direction with the actuating arm 138 abutting against stop projection 182. At this juncture all the stations on strip 98 are removed from view through the display window 16. An indicating key 26 is then depressed, for example, the first indicating key 26 in the second row which would be the numeral "4". Depression of the indicating key 26, as can be seen in FIG. 4, urges the locking bar 78 of locking bar member 56 downwardly until the upper edge of locking tab 72 of indicating key 26 is below the surface of locking bar 78 which then returns to its original position under force of the bias leaf springs 88 and 90 to maintain the indicating key 26 in its depressed position. This depressed condition is shown in FIG. 7 wherein the decoding pin 170 has the lower end thereof depressed a distance below the underside of surface 34 and directly in the line of travel of the encoding pin 134 for numeral "4" (see FIG. 3). As can be seen in FIGS. 5 and 6, the plane of rotation of disc 120 is parallel to the plane of surface 34 with locking bar member 56 being slidably positioned on the top side of surface 34. As shown in FIGS. 3 and 5, the disc 120 is then rotated by depression of the actuating key 28 which has the lower edge of the downwardly depending pin 184 thereof spaced only slightly from the actuating arm 138 of disc 120. With the depression of actuating key 28, the pin 184 thereof depresses the actuating arm 138 a distance sufficient to clear the downwardly depending stop projection 182 to thereby permit rotation of the disc 120 in a clockwise direction as viewed in FIG. 3. As the disc 120 rotates the strip advance sector 132 has the teeth thereof engaging the row of perforations 104 to move the strip 98 to the right as viewed in FIG. 3, this being the rear half of strip 98 thereby causing the front half of strip 98 to move in the opposite direction, that is from right to left. Simultaneously the drive gear sector 130 is engaging the lower gear 150 of drive wheel 140 causing it to rotate in a counterclodkwise direction carrying with it the escapement wheel formed by the teeth 148. As the first tooth 148 engages the left side of anchor 154, the escapement arm 152 is rotated counterclockwise about its pivot 156 thereby causing clapper 160 to bump against the inner surface of bottom cover 14 to emit a sound. At this point, the right-hand arm of anchor 154 is positioned between a pair of escapement teeth 148 and upon contact with one of the teeth 148 the anchor 154 is then rotated clockwise about the pivot 156. This repeated positioning of alternate arms of anchor 154 between the teeth 148 of the escapement wheel effects a speed control function as well as repeated bumping of the clapper 160 against the inner surface of bottom cover 14 thereby emitting a "clacking" sound to enhance the amusement value of the device. This rotation continues through a given path length, or alternatively through a given predetermined angle corresponding to the path length, until the encoding pin 134 for the numeral "4" abuts against the decoding pin 170 for indicating key 26 thereby stopping the rotation of disc 120 with a predetermined number of stations viewable through the window 16, the total number of stations being viewable being four in number with the station 18 corresponding to the numeral "4" being at a predetermined location which is the right-hand station in the display window 16.

If a child happens to depress more than one indicating key 26 after actuation of the pull string 30, the disc 120 would travel the shortest distance until a pin 134 abutted against a decoding pin 170, this shortest distance generally being the lowest numeral of the indicating keys 26 which has been depressed.

If the indicating key 26 corresponding to the numeral "10" is depressed, it is to be noted that the indicating key 26 therefor is not provided with a decoding pin 170, the maximum length of rotation of the disc 120 being determined by the maximum length of travel of drive gear 150 of drive wheel 140 which is that distance determined by the toothed portion of drive gear sector 130 of disc 120, the end of travel of drive gear sector 130 also being defined by an outwardly stepped portion 188 resulting from the two different radii of the two gear sectors 130 and 132 of disc 120.

Referring back to the previous example, where the indicating key 26 for the numeral "4" was depressed and then the actuating key 28 in sequence, the encoding pin 134 is in abutting relation with the corresponding decoding pin 170, at which time the pull cord 30 is not fully retracted into the unit.

In order to clear the unit the child can either pull the pull string 30 partially, or fully, and, as discussed with respect to FIG. 4 upon withdrawing the pull string 30 the locking bar member 56 slides downwardly until the edges of the respective lock bars 78, 80 and 82 permit the locking tabs 72 to clear the lock bar, permitting the key 26 to return to its original position. By partially withdrawing the pull string 30 the disc 120 rotates counterclockwise a distance less than that required to permit actuating arm 138 to engage the downwardly depending stop projection 182. After this action, when the child releases the pull string 30, it will be withdrawn into the unit and wound about spool 146 of drive wheel 140 thereby permitting disc 120 to rotate clockwise under the force of coil spring 124 to its nonenergized position with all ten stations viewable in display window 16. Alternatively, if the child fully withdraws the pull string 30 all stations on strip 98 will be removed from view in the display window 16 and the disc 120 will be stopped at its extreme of rotation by the engagement of actuating arm 138 with the downwardly depending projection 182 as shown in FIG. 3. At this point, the calculator is ready for a subsequent operation upon sequential activation of an indicating key 26 followed by the actuating key 28.

While there has been shown and described a preferred embodiment it is to be understood that various other adaptations and modifications may be made within the spirit and scope of the invention. While the indicia shown in connection with the invention have been illustrated to be numerals, it is to be understood that the indicia can be pictorial illustrations with the respective indicating keys 26 having corresponding indicia such as words thereon or vice versa. Similarly while the display window 16 has been illustrated as being able to display all viewable stations in order to simulate a multi-digit calculator, a smaller window can be employed for viewing only one station. Essentially what has been shown and described is a toy which simulates a calculator by employing a simulated calculator keyboard and a simulated multiple digit display output actuated by a manually operated mechanical logic structure.

What is claimed is:

1. In a toy, the combination comprising:
   a housing having a display window;
   a strip mounted within said housing, said strip having a plurality of stations, each of said stations having indicia viewable through said display window;
   a keyboard mounted on said housing, said keyboard having an actuating key and a plurality of indicating keys equal in number to the number of said stations, each of said indicating keys having indicia thereon corresponding to a predetermined one of said stations;
   manually operable means for removing all of said stations from said display window; and
   means within said housing operatively coupling said manually operable means, said keyboard and said strip for permitting a preselected one of said stations to appear at a predetermined location in said display window upon sequential depression of one of said indicating keys and said actuating key.

2. In a toy, the combination comprising:
   a housing having a display window;
   a strip mounted within said housing for passage adjacent said display window, said strip having a plurality of stations, each of said stations having indicia for viewing through said display window;
   a keyboard mounted on said housing, said keyboard having an actuating key and a plurality of indicating keys equal in number to the number of said stations, each of said indicating keys having indicia thereon corresponding to a predetermined one of said stations;
   spring-biased means within said housing for moving said strip;
   manually operable means coupled to said spring-biased means for operating said spring-biased means to a position against the force of its bias to remove all of said stations from view;
   stop means for retaining said spring-biased means in said position; and
   other means responsive to sequential actuation of one of said indicating keys and said actuating key to move said strip to permit a station corresponding to the so-actuated indicating key to appear at a predetermined location in said display window.

3. The combination according to claim 2 wherein said spring-biased means is a disc rotatably mounted within said housing, said disc having a first gear sector about a portion of the periphery thereof and said strip is provided with a row of perforations matingly coacting with the gear teeth of said first sector.

4. The combination according to claim 3 wherein said disc is provided with a second gear sector about a portion of the periphery thereof and said manually operable means includes a drive gear member coupled to said second gear sector, said drive gear member being rotatable by a pull cord.

5. The combination according to claim 4 wherein said drive gear member has a pulley portion for receiving said cord.

6. The combination according to claim 5 wherein said drive gear member has a portion thereof configured as an escapement wheel and said toy further includes an escapement arm coacting with said escapement wheel to govern the speed of rotation of said disc after actuation of said stop means.

7. The combination according to claim 6 wherein said escapement arm is configured to beat against a portion of said housing during rotation of said drive wheel member.

8. The combination according to claim 3 wherein the keys of said keyboard are mounted in a generally planar array, the plane thereof being generally parallel to and spaced from the surface of said disc.

9. The combination according to claim 8 further including locking means for maintaining a selected one of said indicating keys in a depressed position.

10. The combination according to claim 8 wherein said locking means is a spring-biased lock bar adapted to coact with all of said indicating keys.

11. The combination according to claim 10 wherein said lock bar has means thereon responsive to operation of said pull cord to move said lock bar against the force of its spring to release any of said indicating keys locked in its depressed position.

12. The combination according to claim 8 wherein said other means includes projections on the surface of said disc extending toward said keyboard and projections on most of said indicating keys extending toward said disc, each of the projections on said disc being adapted to engage only one of the projections on said keys only when one of said keys is depressed whereby to rotate said disc a given angular amount to enable the selected station to appear at the predetermined location.

13. The combination according to claim 12 wherein said stop means includes a resilient arm secured to the surface of said disc and a stop projection formed within said housing for coacting with said arm, said actuating key being located adjacent said stop projection and being operable against said arm to release said arm from said stop projection.

14. The combination according to claim 13 wherein the projections on said disc are encoding pins and the projections on said indicating keys are decoding pins on the undersurface of said indicating keys, each of said encoder pins being adapted to abut against only one of said decoder pins.

15. The combination according to claim 14 wherein the indicia on said stations and on said keys are numerals.

16. The combination according to claim 15 wherein said numerals are imprinted in sequential order on successive stations and said display window and said strip are configured to permit a sequence of numerals up to the selected numeral to appear in the display window.

17. In a toy, the combination comprising:
a housing having a display window and a generally planar surface having a plurality of apertures therein;
a strip mounted within said housing for passage adjacent said display window, said strip having a plurality of stations, each of said stations having indicia for viewing through said display window;
a lock bar member slidably positioned on said surface, said lock bar member being spring-biased in a first direction with a portion of said lock bar member in proximity to a substantial number of said apertures;
a keyboard mounted on said housing in a generally planar array over said lock bar member, said keyboard having an actuating key and a plurality of indicating keys operable through said apertures, the number of indicating keys being equal to the number of said stations, each of said indicating keys having means thereon adapted to engage said lock bar member for maintaining a selected indicating key in its depressed condition, each of said indicating keys having indicia thereon corresponding to a predetermined one of said stations;
spring-biased means within said housing for moving said strip;
manually operable means coupled to said spring-biased means for operating said spring-biased means to a position against the force of its bias to remove all of said stations from view, said manually operable means coacting with said lock bar to release any actuated indicating key during operation thereof;
stop means for retaining said spring-biased means in said position; and
other means responsive to sequential actuation of one of said indicating keys and said actuating key to move said strip to permit a station corresponding to the so-actuated indicating key to appear at a predetermined location in said display window.

18. The combination according to claim 17 wherein each of said indicating keys has a locking tab for selectively engaging said lock bar member.

19. The combination according to claim 18 wherein the indicia on said station and on said indicating keys are numerals.

20. The combination according to claim 19 wherein said numerals are imprinted in sequential order on successive stations, and said display window and said strip are configured to permit a sequence of numerals up to the selected numeral to appear in the display window.

* * * * *